UNITED STATES PATENT OFFICE.

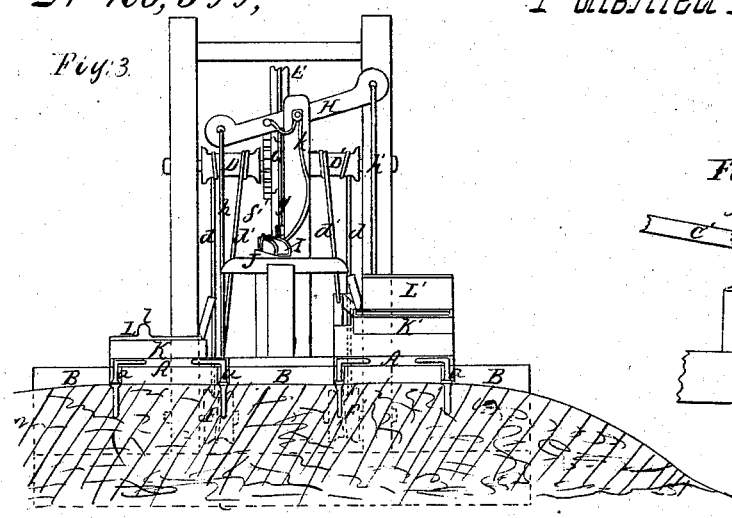
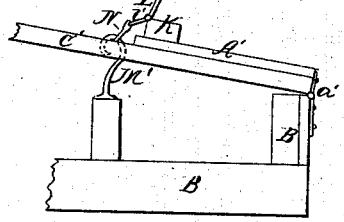
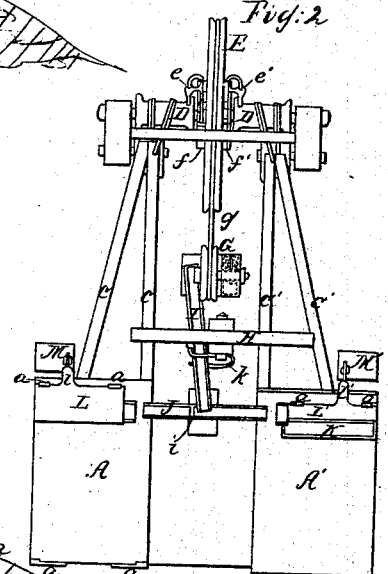
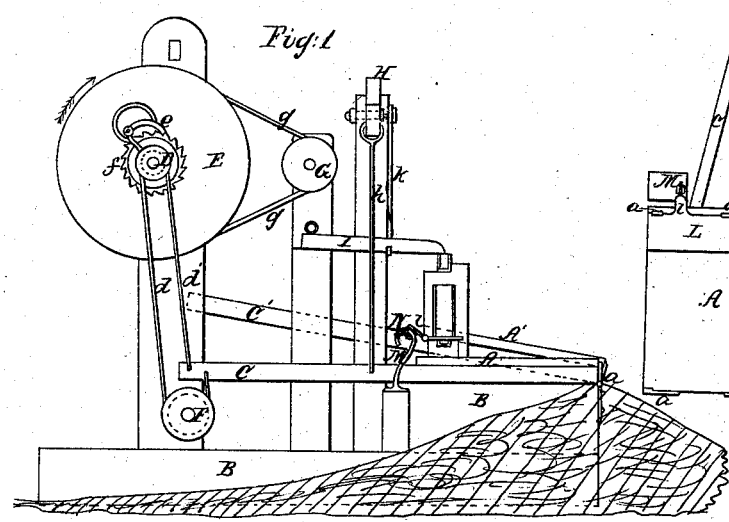

WARREN NICHOLS, OF LIMA, OHIO, ASSIGNOR TO HIMSELF, AND THOMAS GHORMLEY, OF STOKES, OHIO.

CATTLE-PUMP.

Specification of Letters Patent No. 26,399, dated December 6, 1859.

*To all whom it may concern:*

Be it known that I, WARREN NICHOLS, of Lima, in the county of Allen and State of Ohio, have invented certain Improvements in Cattle-Pumps, the construction and operation of which I have described in the following specification and illustrated in its accompanying drawings with sufficient clearness to enable competent and skilful workmen in the arts to which it pertains or is most nearly allied to make and use my invention.

My said invention is intended to remedy the difficulty of inducing cattle to pump a sufficient supply of water for their own use from deep wells, which purpose I accomplish by the following improvements, namely. First, the device hereinafter described, by which the animal is induced to change position from one platform to another, thereby giving increased operation to the pump, as subsequently set forth; second, the arrangement of parts by which the supply stream of water is changed from one trough to the other, as set forth.

The accompanying drawings represent my invention as follows: Figure 1, is a side elevation of my improved cattle pump. Fig. 2 is a plan. Fig. 3 is an end elevation. Fig. 4 is a detail view, showing more clearly the mode of operating the covers which close the troughs and cause the animal to change position.

A, A, are the platforms, which are hung at the rear end to the bed framing B by means of hinges a, a, as shown in Figs. 1 and 3. The timbers C upon which the platform is supported, extend forward so as to connect with the cords d, d', which pass over the pulleys D, D', on the shaft of the wheel E. These cords d, d', also pass down under the pulleys F, F', and are returned from the back side of these pulleys to the back side of the pulleys D, D', for the purpose of turning them backward on the shaft, and thereby taking up the cord on the front side, so as to prepare it to operate the wheel E at the next descent of the platform to which it is connected. These pulleys D, D', are hung loosely upon the shaft to allow them to revolve upon it which they are allowed to do in a backward direction. They are so connected to the wheel by the pawls e, e', and ratchet wheels f, f', that if either of them is turned forward it will propel the wheel E in the direction indicated by the arrow in Fig. 1. The arrangement is such as to allow the pulleys D to turn freely back upon the shaft, as before intimated and as shown on the drawings. The wheel E is connected by a belt g to the pulley G on the shaft of the crank which operates the piston of the pump to draw the water from the well. It will be obvious from what has been said that the depression of either platform will turn the wheel E by its connection with the pulley G, and consequently that the crank shaft upon which the said pulley is hung will operate the pump.

To obviate the necessity of a weight or counterpoise to return each platform to its highest position, after it has been depressed, I have conceived a plan of so connecting the two platforms by means of the beam H and the cords or rods h, h', as shown, that the depression of one platform brings the other into the position to be again operated as before. It is obvious that the same result may be attained in substantially the same way by using pulleys and a cord or chain passing over them, instead of the beam. The water is conducted from the pump on its way to the troughs by a spout I, which delivers it into an intermediate spout J, from which it is delivered to the troughs K, K'. This spout J has a partition i at or near the middle for the purpose of directing the stream of water to one trough or the other as may be indicated by the position of the spout I. The position of this spout I is changed for the purpose of supplying water to each trough alternately, by means of an arm k attached to the lever or beam H, and as either platform descends it shifts the stream from the trough forward of it to the one opposite, as will be obvious from an inspection of the construction of the parts as represented in the drawings. This change is made just as the platform closes its descent or reaches its lowest position, which serves to call the attention of the animal in the direction of the opposite trough just at the proper moment, and acts to induce him to go to the opposite platform from the one upon which he is standing. As a further inducement to this change of position, the drinking troughs are provided with lids or covers L, L', which are hinged to the back side of the troughs, and are closed upon the descent of the platform to which they belong. To accomplish this, an arm $l$, $l'$, is extended back from each cover as shown, and upon the descent of the platform this arm strikes upon a stop M or M′, and the continued descent of the platform closes the cover down upon the trough as shown in Fig. 1. The stops M, M′, are stationary and permanently attached to a fixed frame, while the drinking troughs are attached upon the platforms and move with them. The animal being thus shut away from the water in the trough before which he is standing, is thus induced to seek a more eligible situation for his purpose, and this he does by going upon the other platform and drinking from the other trough the lid of which is raised by means of a string N or N′, which connects the arm which extends back from the lid with the stop which acts to shut the cover down, as shown in Fig. 4. It is evident that a permanent stop set in the proper position would answer the same purpose as the string and might be less liable to derangement. By these improvements the raising of an abundance of water is insured, and a constant supply of the fluid kept on hand so that the troughs are never empty.

Having thus fully described the said invention, I claim as the improvements which constitute it, and which were originally and first invented by me:

1. The combination with the covers L, L′, of stops which will open the trough when its corresponding platform rises to its highest position, and close it when the platform descends to its lowest position, as herein described for the purpose set forth.

2. The arrangement described of the spout I, in combination with the arm $k$, or with some other part operated by the descent of one of the platforms, by which the direction of the water is changed near the close of the descent of the platform as set forth, for the purpose stated.

WARREN NICHOLS.

Witnesses:
 J. L. HUGHES,
 JOHN P. HALLER.